United States Patent
Hanumanthappa et al.

(10) Patent No.: US 10,095,611 B1
(45) Date of Patent: Oct. 9, 2018

(54) METHODOLOGY FOR UNIT TEST AND REGRESSION FRAMEWORK

(71) Applicant: INFINERA CORPORATION, Sunnyvale, CA (US)

(72) Inventors: Jayaram Hanumanthappa, Bangalore (IN); Ravi Shankar Pandey, Bangalore (IN); Rajasekar Venkatesan, Saratoga, CA (US); Anthony Jorgenson, Freemont, CA (US)

(73) Assignee: Infinera Corporation, Sunnyvale, CA (US)

( * ) Notice: Subject to any disclaimer, the term of this patent is extended or adjusted under 35 U.S.C. 154(b) by 8 days.

(21) Appl. No.: 15/476,359

(22) Filed: Mar. 31, 2017

(51) Int. Cl.
- *G06F 9/44* (2018.01)
- *G06F 11/36* (2006.01)
- *G06F 9/54* (2006.01)
- *G06F 9/48* (2006.01)

(52) U.S. Cl.
CPC ........ *G06F 11/3692* (2013.01); *G06F 9/4806* (2013.01); *G06F 9/546* (2013.01); *G06F 11/3688* (2013.01)

(58) Field of Classification Search
None
See application file for complete search history.

(56) References Cited

U.S. PATENT DOCUMENTS

| | | | | |
|---|---|---|---|---|
| 7,305,582 B1* | 12/2007 | Moser | ..................... | G06F 9/526 714/11 |
| 9,703,693 B1* | 7/2017 | Pasupuleti | .......... | G06F 11/3688 |
| 9,959,194 B1* | 5/2018 | Mola | ................... | G06F 11/3636 |
| 2005/0034014 A1* | 2/2005 | Moser | ..................... | G06F 9/485 714/17 |
| 2009/0133033 A1* | 5/2009 | Lindo | ................ | G06F 11/3624 718/108 |
| 2013/0227528 A1* | 8/2013 | Mathew | .............. | G06F 11/3684 717/124 |
| 2017/0123877 A1* | 5/2017 | Gongloor | .............. | G06F 11/079 |
| 2017/0206264 A1* | 7/2017 | Frerking | ........... | G06F 17/30578 |

* cited by examiner

*Primary Examiner* — Insun Kang
(74) *Attorney, Agent, or Firm* — David L. Soltz

(57) ABSTRACT

Disclosures herein describe a record and replay regression and unit test automation framework for simulating any hardware on a virtual machine to achieve thorough, affordable and efficient software testing. According to the disclosures herein, the test automation framework includes a recording stage where input and output messages for all the interfaces for a process (e.g., an embedded system or any software system or process) running on the original hardware may be recorded along with metadata in a space-optimized and efficient manner. The testing framework also includes a replay stage using innovative thread synchronization approaches that leverage the metadata to simulate the environment for the recorded embedded process in isolation, which may be done on an inexpensive machine or hardware. Thus, the original custom hardware, which may be expensive and costly to run, is not needed for the replay phase of testing.

20 Claims, 13 Drawing Sheets

METHODOLOGY FOR UNIT TEST AND REGRESSION FRAMEWORK

FIELD OF INVENTION

The disclosure relates generally to software testing and more particularly to a record and replay based regression and unit test automation framework.

BACKGROUND

Test automation software may be developed for effective software testing, whereby repetitive tasks may be automated in a formalized testing process and other tasks, which may be difficult to do manually, may be performed. A test automation framework may be an integrated system that sets the rules and combines approaches for automation of a particular software product or products in an effort to simplify automation testing. For example, a test automation framework may integrate function libraries, test data sources, object details and/or various reusable modules and other building blocks which form a process (i.e., a process is an instance of a computer program being executed and may be made up of multiple threads of execution that execute instructions concurrently). A test automation framework may provide the basis of test automation, and may reduce the cost of testing and maintenance. For example, if there is change to any test case then only the test case file may be updated and the driver script and startup script may remain the same.

A growing trend in software development is the use of testing frameworks that allow the execution of unit tests, wherein individual units of the software or sections of the code are tested separately using appropriate test cases to verify that each unit performs as expected. A unit of software may be considered the smallest testable part of software, and may have one or more inputs and one or more expected outputs. For example, a unit of software may be, but is not limited to the following: a program; a function; a method; a class; an application module; and/or procedure. Unit testing may be particularly efficient and effective when a piece of code is being modified or changed, because it permits the testing and removal of defects in the modified code prior to introducing it into the integrated software system. A limitation of existing unit testing frameworks is that input and output signals are manually generated, which is generally a costly and time-consuming task that is unable to properly record the complexity of all possible events.

Another software testing framework technique is regression testing, which verifies that software that was previously developed and tested still performs correctly when the software is modified or interfaced with other software. Examples of software changes include, but are not limited to: software enhancements; software upgrades; software patches; and/or configuration changes. During regression testing, new software bugs or regressions may be uncovered, and may thus be corrected before releasing a new version of the software. Regression testing may be performed to test a system efficiently by systematically selecting the appropriate minimum set of tests needed to adequately cover a particular change and may involve rerunning previously completed tests and checking whether program behavior has changed and whether previously fixed faults have re-emerged.

Software testing may employ record and replay (i.e., record and playback) techniques that allow users to interactively record user actions and replay them back any number of times during testing. For example, record and replay testing may be an effective tool during regression testing to verify that any changes made to any portion (e.g., unit) of software results in the desired outcome. Record and replay testing may work with any type of software application with an output interface, such that the actual results generated during testing may be compared with the expected results to detect errors or bugs.

SUMMARY

Disclosures herein describe a record and replay regression and unit test automation framework for simulating any hardware on a virtual machine to achieve thorough, affordable and efficient software testing. According to the disclosures herein, the test automation framework includes a recording stage where input and output messages for all the interfaces for a process (e.g., an embedded system or any software system or process) running on the original hardware may be recorded along with metadata in a space-optimized and efficient manner. The testing framework also includes a replay stage using innovative thread synchronization approaches that leverage the metadata to simulate the environment for the recorded embedded process in isolation, which may be done on an inexpensive machine or hardware. Thus, the original custom hardware, which may be expensive and costly to run, is not needed for the replay phase of testing.

DETAILED DESCRIPTION OF THE EMBODIMENTS

Figure 1:
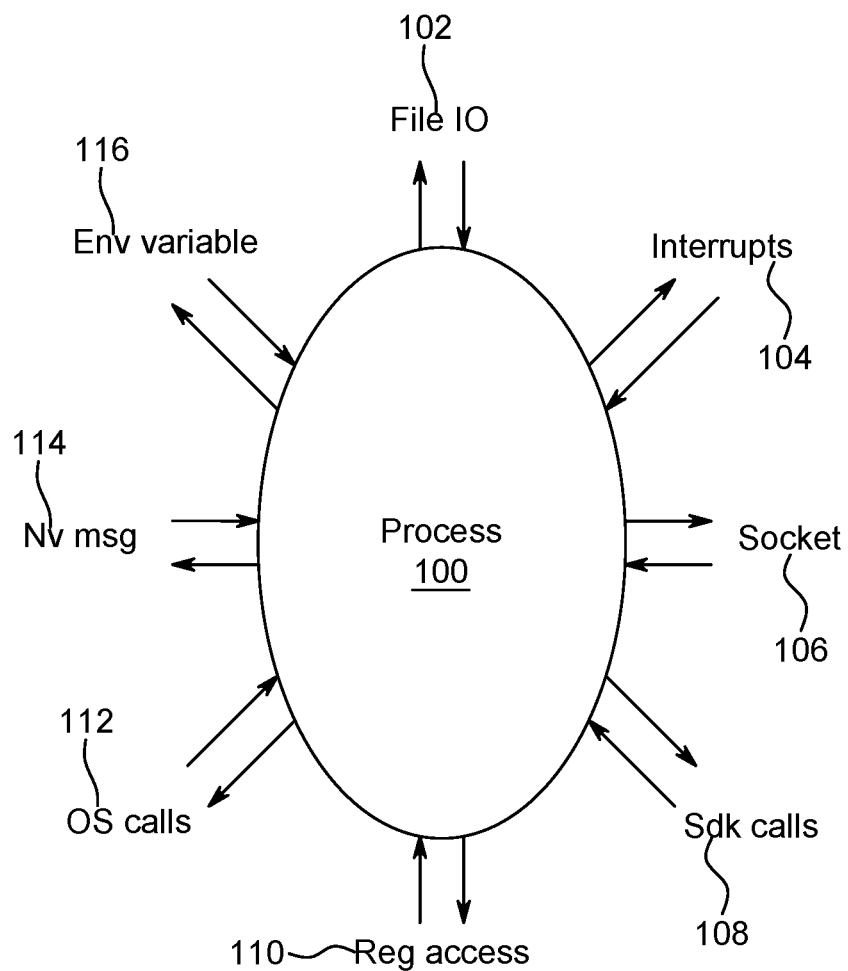
FIG. 1 shows a high-level system diagram of example interfaces between a process and the outside world.

Embodiments disclosed herein describe a record and replay regression and unit test automation framework for simulating any hardware on a virtual machine to achieve thorough, affordable and efficient software testing. According to the disclosures herein, the test automation framework, also referred to as the Grand Unit Testing System (GUTS) framework, includes a recording stage where inputs and outputs for all the interfaces for a process (e.g., an embedded system or any software system or process) running on the original hardware along with relevant meta information may be recorded. The testing framework also includes a replay stage using innovative thread synchronization approaches that leverage the meta information to simulate the same environment for the recorded embedded process in isolation on an inexpensive machine or hardware. Thus, the original custom hardware, which may be expensive and costly to run, is not needed for the replay phase of testing.

A limitation of existing record and replay or unit testing frameworks is that input and output signals are manually generated, which is generally a costly and time-consuming task that is unable to properly record the complexity of all possible events. As a solution to this, the disclosed record and replay regression and unit test automation framework uses metadata to record millions of messages (i.e., input/output exchanges) in a space-optimized and efficient manner. The disclosed testing framework is able to leverage the stored metadata to emulate the exact same environment for the embedded software (process) as it runs on the actual hardware, and thus accurately replays all the messages and captures all possible events.

The GUTS framework enables the automation testing process to work in isolation by providing a way to supply the input messages and react to the output messages of the process in various test scenarios in a simple and systematic manner using the meta information, thus making it easy to implement and scale. The GUTS framework is able to simulate and regress any process in isolation on a simple processor (e.g., an x86 based system) by emulating the same environment as the actual encompassing system with minimum impact on application code.

The GUTS framework may be used for testing any software unit in isolation. Examples of a software unit include, but are not limited to, any of the following: process; module within a process; program; function; method; class; application module; embedded system; and/or procedure. In an example, each system process (i.e., a process is an instance of a computer program being executed and may be made up of multiple threads of execution that execute instructions concurrently) may be treated as a unit for the purpose of testing.

The embodiments disclosed herein may be used for testing any software system. For example, the embodiments herein may be well suited for testing an embedded system (e.g., one or more individual processes within an embedded system), wherein an embedded system may be software and/or hardware system with a dedicated function within a larger mechanical or electrical system, and may include real-time computing constraints. For example, an embedded system may be embedded as part of a custom device or piece of equipment (e.g., specialized machinery, control system etc.) that may include software, hardware and/or mechanical parts. The encompassing system that includes the embedded system may be complex and very costly to run or reproduce. For example, the encompassing systems may require the generation of complex environmental parameters such as a test set and additional pieces of hardware (e.g., hardware components) in order to run. Thus, it may be beneficial to be able to test modifications and upgrades to an embedded system (i.e., regression testing) by running it on a separate inexpensive system (e.g., basic computer) using the disclosed record and replay regression and unit test automation framework prior to integrating the embedded system into the intended encompassing system.

FIG. 1 shows a high-level system diagram of example interfaces between a process 100 and the outside world. The interfaces of process 100 enable communication of input and/or output signals between the process 100 and other elements of a system or devices external to the process 100 (e.g., the outside environment, the outside world), including other processes (not shown). Examples of types of interfaces include, but are not limited to, the following: file input/output (I/O) 102 (enables read and/or writing to a file); network socket 106 (endpoint to communication flow processes over a network); software development kit (SDK) calls 108 (access to software development tools); register access 110 (access to storage); operation system (OS) calls 112 (communication with the OS); name-value (nv) message interface 114 (communication with a server); and/or environment variable interface 116 (to access environment variables). For example, process 100 may communicate with other processes (not shown) via network sockets 106 and may access device(s) such as memory mapped registers (not shown) using register access 110 or signal interrupts 104 to a processor (not shown) to execute an immediate event.

Figure 2:
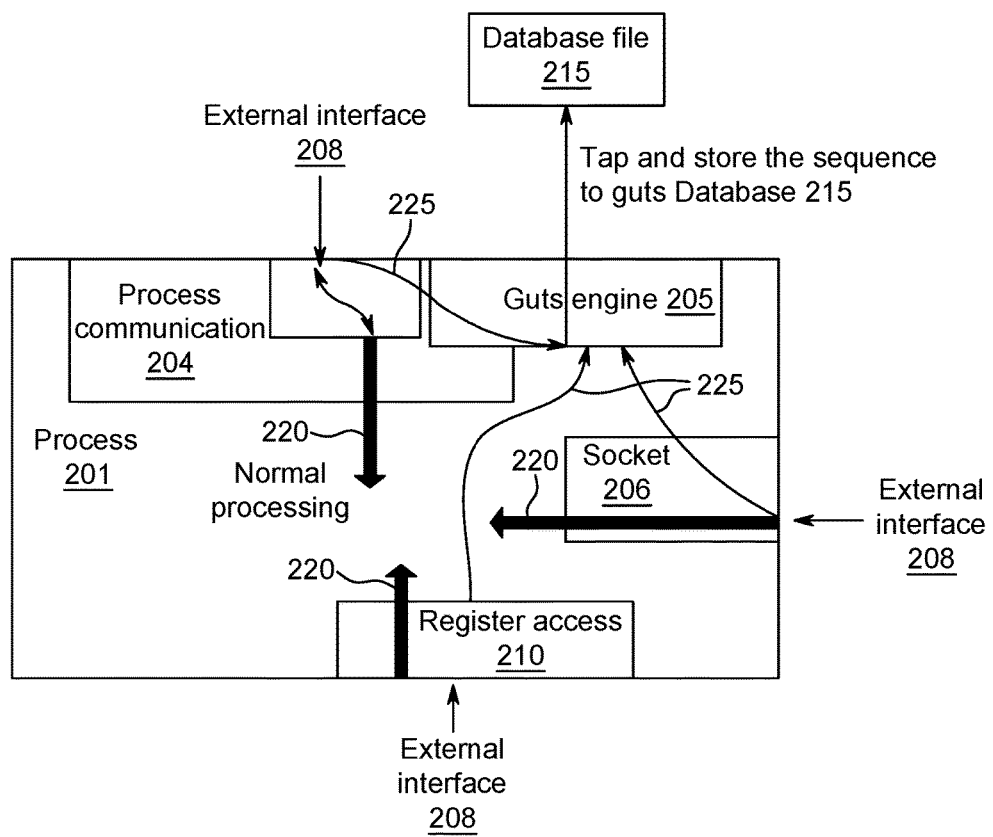
FIG. 2 shows a system diagram of an example process including various interfaces for interacting with components external to the process.

FIG. 2 shows a system diagram of an example process 201 including various interfaces for interacting with components external to the process 201 during a recording phase 200 as part of an example record and replay regression and unit test automation framework, in accordance with the disclosures herein. Process 201 may be part of a system being tested (e.g., an embedded system) and may include distinct interface types that interact with external interfaces 208 (i.e., the external environment). Examples of interfaces that may be part of process 201 include, but are not limited to, the following interfaces: socket interface 206; process communication interface 204; and/or Register Access (RA) interface 210.

The process 201 may include and/or interact with a record and replay regression and unit test automation framework engine 205, also referred to as a GUTS engine 205, in accordance with the disclosures herein. The GUTS engine 205 may be configured to perform the recording phase (procedure) 200 of process 201, as described below.

During recording phase 200, the process communication interface 204, the socket interface 206, and the RA interface 210 may perform normal processing 220 within process 201. For example, the RA interface 210 may access data from a register (not shown) to extract instructions external to process 201 via an external interface 208 as part of its normal processing 220. In another example, socket interface 206 may send and receive data to an external interface 208 of an external device (not shown) over a network (not shown) (e.g., using Internet protocol (IP)). In another example, the process communication interface 204 may serve as the communication layer for the process 201.

During normal processing 220, the GUTS engine may record 225 all the inputs and outputs to process 201 over the internal interfaces 204, 206, and 210. In an example embodiment of recording phase 200, the GUTS engine 205 may be designed to include a snooping layer (e.g., a traffic tap) that may intercept or "tap" all of the input and output messages for process 201. A snooping layer may reduce the risk of refactoring or the tapping changing or affecting the normal processing 201 during the recording.

The inputs and outputs to process 201 may be stored by the GUTS engine 205 to a database or file 215. For example, the database or file 215 may exist on an external "GUTS" database server (not shown). In an example, the recording or tapping of input and output messages may use serialization codes in order to translate data structures or object states pertaining to the input and output messages into a format that can be stored in memory (e.g., database or file 215). However, the recording or tapping of input and output messages may not affect or change the way the input and output messages are exchanged in the semantic code of the process 201, and thus may not interfere with or alter the normal processing 220 of process 201.

According to an embodiment, the GUTS engine 205, as part of recording phase 200, may be configured to generate a record for each tapped input or output message, where the record includes the message itself and associated meta information (i.e., metadata). The meta information may be used to effectively replay the messages during the replay phase of the record and replay regression and unit test automation framework. Thus, the tapped input or output messages may result in a sequence of records including all the captured messages arranged in timing order (e.g., in the order they occurred in time) along with the associated meta information. For example, the record sequence may be stored in memory by storing the individual records (e.g., message+metadata) in timing order by occurrence during the recording phase.

In an example, the meta information for each message may include a sequence number to maintain a timing order or a global order sequence of the messages. In an example, the sequence number may be a 64 bit number. Other examples of meta information include, but art not limited to, any one or more of the following: key; message type (e.g., synchronous, asynchronous, input, output, etc.); action name; action start time and/or end time; thread name; sequence number; test case identification (ID); and/or test case name. For example, the key may be stored in the meta information during the recording phase and may be unique to the process. For example, for data read from a socket interface 206 during the recording phase, the process name and socket description may be stored in the meta information and may together be defined as a key.

According to an embodiment, the recorded sequence of messages and corresponding metadata (i.e., the record sequence) may contain all the external input and output messages that may be needed for process 201 to go through its processing for a given test case. Thus, if the process 201 is viewed as a unit undergoing unit testing via the disclosed record and replay regression and unit test automation framework, then the captured (i.e., recorded or tapped) sequence of records contain the mock of the environment/world external to and interfacing with process 201 for a given test case. Thus, the entire experience of process 201 is captured in the recorded sequence of records. In an embodiment, the captured record sequence may include, but is not limited to include, 3 types of records: records comprising asynchronous (autonomous) messages that the process 201 must receive; records comprising synchronous "request-response" messages; and records comprising output messages.

The recording phase 200 may enable the next phase of the disclosed record and replay regression and unit test automation framework: the replay phase (procedure or process). Because the recording phase 200 effectively captures the entire experience of the process 201 via the recorded record sequence (e.g., stored in a database and/or sequence file), the process 201 (e.g., with modifications or changes), can be run or replayed through the entire test case(s) from the recording phase without requiring any of the external support systems such as the external devices or the greater system (e.g., hardware and/or software) containing the process 201. Thus, the process 201 may be run independently or by itself on a separate system without any further code changes.

As stated above, the types of messages that may be included in the record sequence may include asynchronous messages, synchronous request-response messages, and/or output messages. According to an embodiment, the replay procedure or phase of the disclosed record and replay regression and unit test automation framework may perform, but is not limited to perform, the following actions based on the message type: injecting recorded asynchronous messages when the asynchronous messages' turns have arrived; giving the responses to expected requests when the expected requests arrive for synchronous messages; and/or comparing output messages with the corresponding recorded output messages. The GUTS replay process may use the meta information stored in each record to effectively replay all these three distinct types of messages, as described in further detail below.

Figure 3:
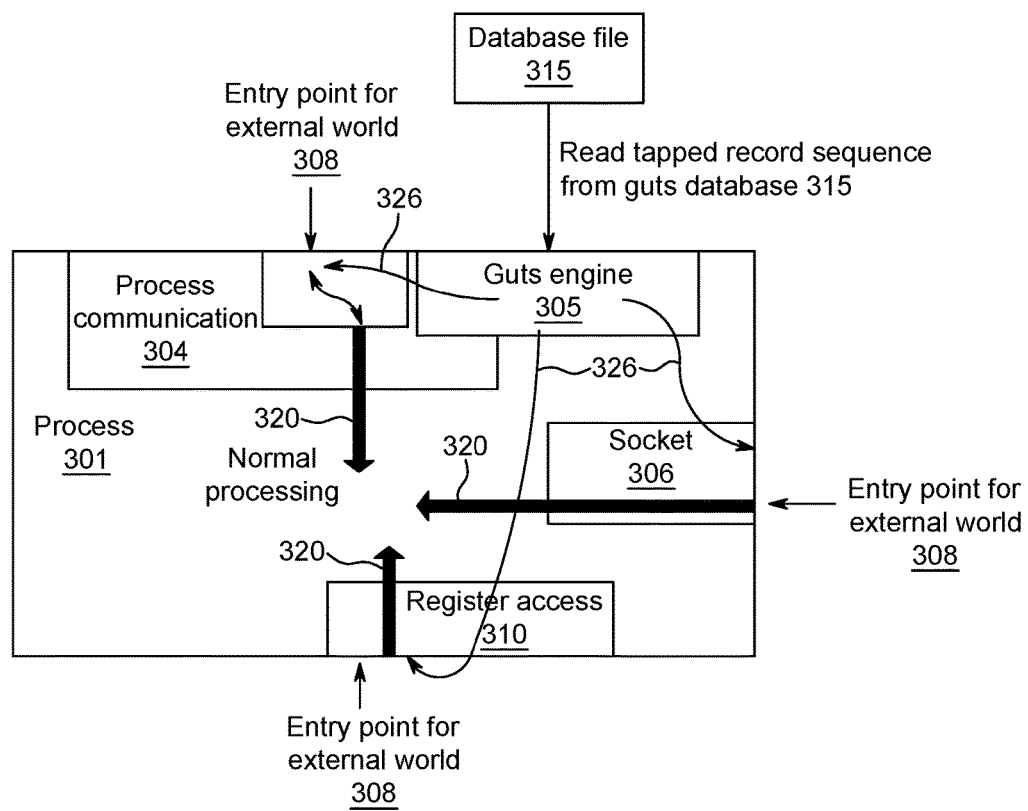
FIG. 3 shows a system diagram of an example process including various interfaces to the external world during a replay phase as part of an example record and replay regression and unit test automation framework, in accordance with the disclosures herein.

FIG. 3 shows a system diagram of an example process 301 including various interfaces to the external world 308 during a replay phase 300 as part of an example record and replay regression and unit test automation framework, in accordance with the disclosures herein. Like process 201 in FIG. 2, process 301 may be part of a system being tested (e.g., an embedded system) and may include distinct interface types that interact externally via entry points to the external world 308. Examples of interfaces include, but are not limited to, the following interfaces: socket interface 306; process communication interface 304; and/or RA interface 310. The interfaces 304, 306 and 310 may perform normal processing 320 within process 301 during the replay phase 300. During replay phase 300, the process 301 may be run independently or in isolation (e.g., on a basic computer) from its original host system for reduced cost testing in accordance with the disclosed record and replay regression and unit test automation framework.

The GUTS engine 305 may run a replay phase 300 to carry out the record and replay regression and unit testing of process 301 using the tapped record sequence that was stored in database/file 315 during the recording phase (e.g., recording phase 200 in FIG. 2). As part of the replay procedure 300, the GUTS engine 305 may read the tapped records from database/file 315 in order to simulate the whole external environment to process 301 (from recording phase 200) through the playback 326 of the tapped messages.

In accordance with the disclosed record and replay regression and unit test automation framework, the GUTS engine 305 may use the metadata stored in each record to effectively replay the distinct types of messages within process 301 according to the following rules. According to a first rule in accordance with the disclosures herein, if a message is an asynchronous message, then the message may be injected (replayed 326) by the GUTS engine 305 into process 301 on its turn (e.g., when it reaches the head of the queue under strict order, as described in FIG. 4). According to a second rule in accordance with the disclosures herein, if a message is a synchronous message, the GUTS engine 305 may replay 326 an expected response (i.e., the synchronous message) in response to a request from the process (e.g., synchronous messages may be given to the process in strict or loose order, as described in FIGS. 4 and 5). According to a third rule in accordance with the disclosures herein, if a message is an output message, the GUTS engine 305 may compare the output message generated by process 301 with the corresponding recorded output message in the stored record sequence to test the accuracy of process 301 and detect bugs or errors in process 301.

The GUTS engine 205/305 shown in FIGS. 2 and 3 may be implemented in hardware and/or programmed in software to perform the functions of the disclosed record and replay regression and unit test automation framework, including recording phase/procedure 200 and/or the replay phase/procedure 300. For example, software implementing GUTS engine 205/305 may be downloaded to a processor and/or memory in electronic form, over a network, and/or it may be provided on tangible media, such as magnetic or optical media or other nonvolatile memory. For example, GUTS engine 205/305 may be a software module that may be downloaded and installed on the system being tested (e.g., an embedded system). For example, the GUTS engine 205/305 may be downloaded/installed/implemented in a device and/or processor, such as the example device 1200 shown in FIG. 12 to add the functionality of the disclosed record and replay regression and unit test automation framework to the device 1200.

Multiple innovative procedures may be implemented as part of the replay procedure 300, in accordance with the disclosures herein, to ensure cost-efficient and accurate software testing of a process 301. Examples of innovative replay mode procedures are described below and may be used alone or in any combination as part of the recording phase and/or replay phase of a record and replay regression and unit test automation framework, in accordance with the disclosures herein.

According a first example innovative procedure, one of the following two approaches may be used to process the tapped record sequence during the replay phase: a strict order approach on per a thread basis; or a loose order approach on a per-thread basis. For example, one of the strict order approach or the loose approach may be selected to be used during replay mode based on the application being tested and/or the type of message as indicated by the meta information. A loose order approach may be more flexible, and may be used, for example, if a threading structure in a process is complex or if minor deviations in the replay phase of testing from the recorded version of the process, can be tolerated.

Figure 4:
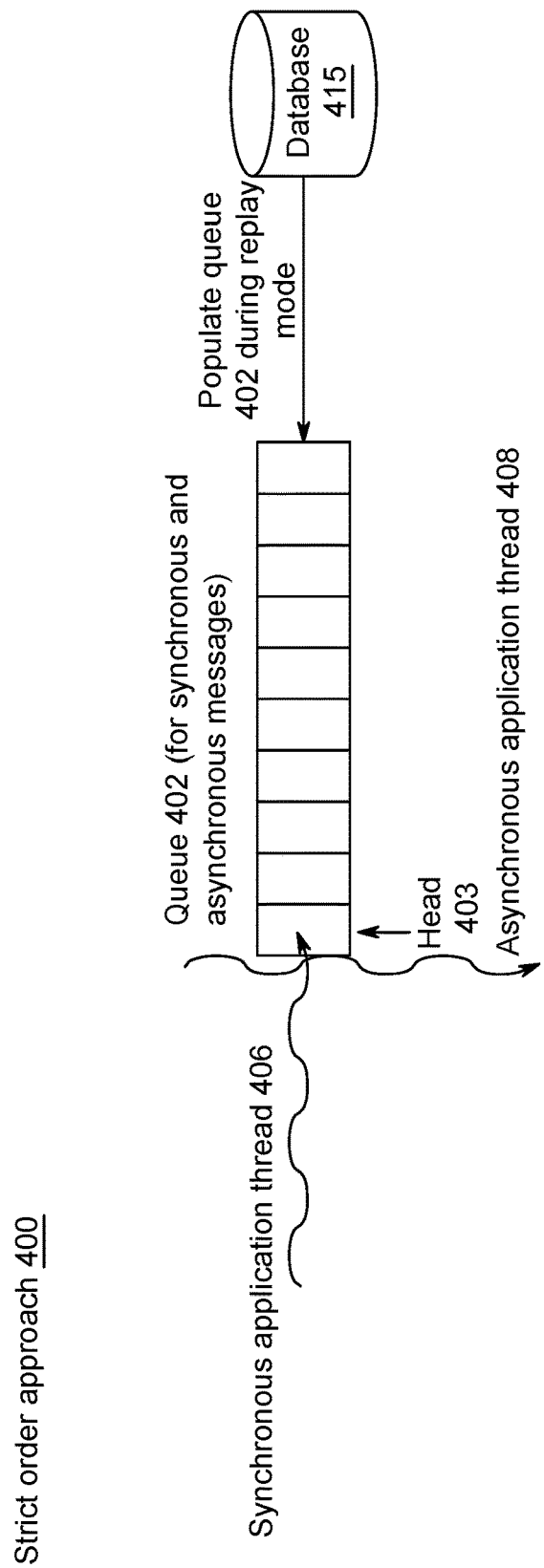
FIG. 4 shows a system diagram of an example strict order approach to accessing recorded messages during a replay phase of a record and replay regression and unit test automation framework, in accordance with the disclosures herein.

FIG. 4 shows a system diagram of an example strict order approach 400 to accessing recorded messages during a replay phase of a record and replay regression and unit test automation framework, in accordance with the disclosures herein. According to the example strict order approach 400, a GUTS engine (not shown) may populate a local queue 402 with synchronous and asynchronous messages (or records including the messages and metadata) that were stored in the GUTS database 415 during the recording phase of testing. The messages may be placed in the queue 402 in sequential order as defined during the recording phase, with the beginning of the sequence being placed at the head 403 of the queue 402.

According to the example strict order approach 400, an application thread 406 of the process being tested may only receive synchronous type messages when the synchronous message is at the head 403 of the queue 402. In other words, under strict order, the application thread 406 may wait to access until the appropriate synchronous message has reached the head 403 of the queue 402. In this way, the strict order approach 400 may ensure that the order of execution of the synchronous messages is exactly the same as the order during the recording phase. Likewise, under the strict order approach 400, asynchronous messages may be injected to the process (e.g., application) being tested based on when the asynchronous message reaches the head 403 of the queue 402.

Figure 5:
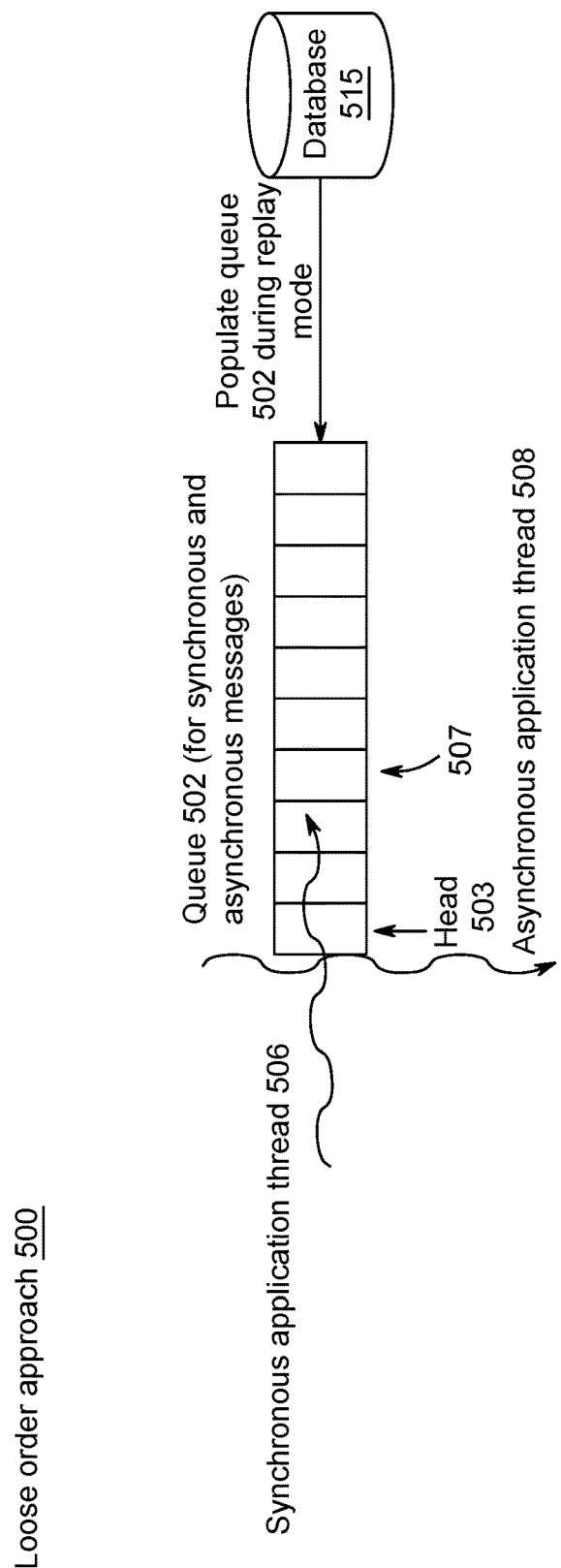
FIG. 5 shows a system diagram of an example loose order approach to accessing recorded messages during a replay phase of a record and replay regression and unit test automation framework, in accordance with the disclosures herein.

FIG. 5 shows a system diagram of an example loose order approach 500 to accessing recorded messages during a replay phase of a record and replay regression and unit test automation framework, in accordance with the disclosures herein. According to the example loose order approach 500, a GUTS engine (not shown) may populate a local queue 502 with synchronous and asynchronous messages (or records including the messages and metadata) that were stored in the GUTS database 515 during the recording phase of testing. The messages may be placed in the queue 502 in sequential order as defined during the recording phase (e.g., by sequence numbers in the meta information), with the beginning of the sequence being placed at the head 503 of the queue 502. An example of an asynchronous message is a response message to a request for information, explanation or data that is not needed immediately. For synchronous messaging, an application or system must wait to receive the synchronous (response) message before continuing its processing.

According to the example loose order approach 500, an application thread 506 of the process being tested may enter deep into the queue 502, for example to element 507 of queue 502, to retrieve synchronous type messages. In an example, the location of a synchronous message deep in the queue 502, for example at element 507, may be located and retrieved based on a key. For example, the key may be stored in the meta information during the recording phase and may be unique to the process (e.g., process name+socket description). Thus, under loose order, the application thread 506 need not wait to access a synchronous message but may retrieve the synchronous message from the queue 502 as soon as it is needed. Under a loose order approach 500, there is no dependence between threads and there may be some deviation in the order of processing synchronous messages between the recording and replay phases. The loose order approach may cause a deviation in the replay phase from the global sequence order during the recording because some messages may be bypassed in the queue. Thus, the loose order may be used when such deviations can be tolerated As shown in the approaches of FIGS. 4 and 5, an example rule for replaying messages during a replay phase of a test automation framework may be as follows: asynchronous messages may always be retrieved from a queue in strict order; and synchronous messages may be retrieved in strict order or loose order depending on the application. For example, a GUTS engine, during replay mode, may select to use a strict order approach for accessing recorded messages for an object management process that is responsible for bookkeeping the configuration data of a system, where the order of playback may not be modified. In another example, a GUTS engine, during replay mode, may use a loose order approach for accessing recorded messages for a driver process that has strict coupling of threads such that some deviation in the order of messages can be accommodated.

The strict order approach and the loose order approach determine the order of the execution of the threads. Under strict order approach, the order of the execution of threads matters and thus may be forced to comply with the order of messages in the queue. Under the loose order approach, the order of execution of the threads involved does not matter, such that one or the other thread can execute first without impacting or changing the operation or behavior of the process.

According to a second example innovative procedure, an innovative check pointing approach may be used during the recording and/or replay phase of a record and replay regression and unit test automation framework, in accordance with the disclosures herein.

For a thread of a particular process, during a recording phase of testing a thread may complete running a particular task at particular time, $t_1$, relative to one or more other threads running in parallel. The running time of the thread may not be the same during the replay phase of testing, such that the thread may complete the task earlier or later than $t_1$. This may result in a different order in the completion of threads in the replay phase versus the recording phase, which may or may not change the behavior of the process depending on the application and the particular tasks.

In cases where the order of completion of tasks by threads of a process may affect the behavior of the process, check points (or suspension points) may be added to the respective threads in order to force a particular thread that completed a task early to wait until its corresponding checkpoint to complete the task. For example, the checkpoint may be added during the recording phase of testing and stored in the meta information associated with a particular message or thread. Thus, check pointing may be used to enforce a strict order or synchronization, when needed, between threads running in parallel to ensure that the behavior of the process during the replay phase exactly matches the behavior of the process during the recording phase to produce an accurate testing environment.

Checkpointing may be achieved by forcing the thread to suspend further operation until a particular message gets processed and/or reaches a set checkpoint. For example, the thread may run in a loop while waiting. Another technique that may be used to achieve checkpointing is sending a sleep command to the thread indicating an amount of time to sleep or suspend until the checkpoint is reached. Checkpointing, as disclosed herein, may be used to solve pacing issues because of different speed and/or synchronization the recording and replay phases. In an example, checkpoints may be avoided when a thread has a software lock to wait for a particular event in order to prevent the checkpoint together with the software lock from causing a dead lock condition for the process.

Checkpointing may be used to restrict or control inter-thread pacing to ensure that the relative difference in execution for different threads controlled through check pointing is always less than the polling interval measured during the recording phase. As explained above, in replay mode checkpointing message will follow a strict order of operation in that checkpoints maintain the exact order of execution (and in particular the order that tasks are completed) of threads in the replay phase as in the recording phase.

Figure 6:
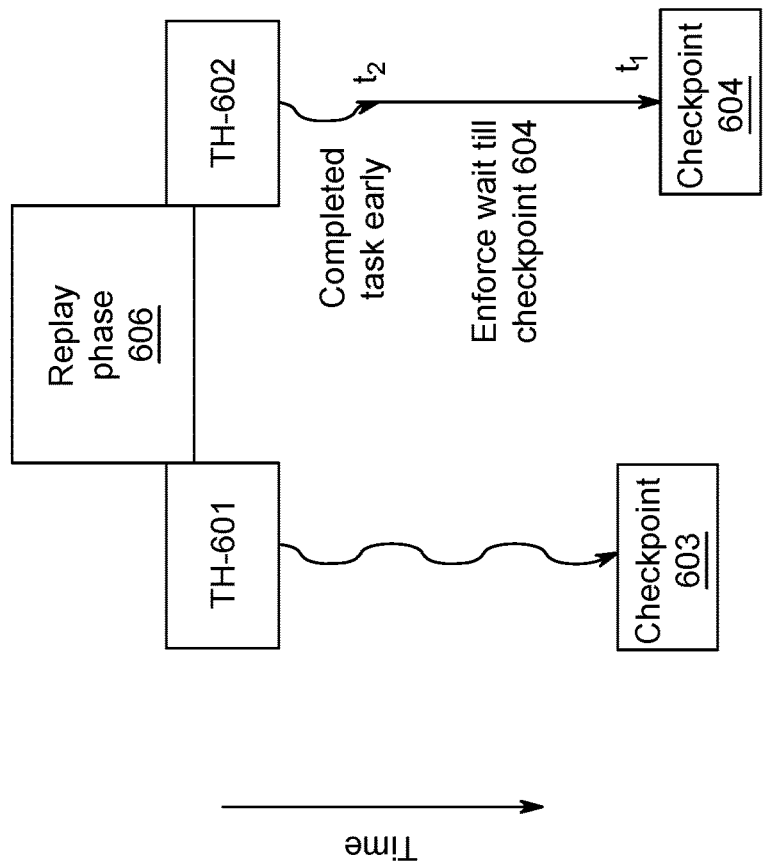
FIG. 6 shows a timing diagram of example parallel thread executions using checkpoints during a recording phase and a replay phase of a record and replay regression and unit test automation framework, in accordance with the disclosures herein.
Figure 6:
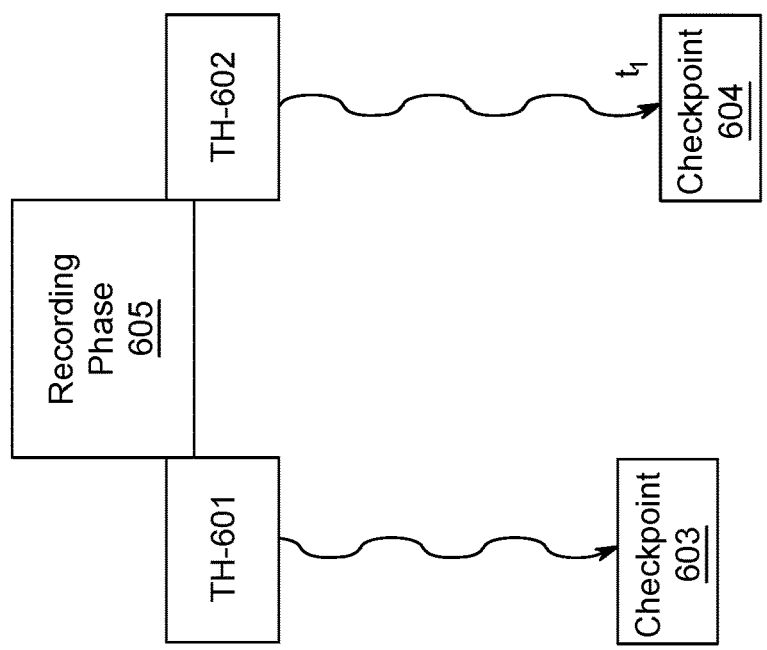

FIG. 6 shows a timing diagram of example parallel thread executions using checkpoints during a recording phase 605 and a replay phase 606 of a record and replay regression and unit test automation framework, in accordance with the disclosures herein. In the example of FIG. 6, during recording phase 605, the time of completion of thread 601 may be recorded as checkpoint 603, and the time of completion of thread 602, $t_1$, may be recorded as checkpoint 604. In this example, the checkpoints 603 and 604 are recorded because the relative order of completion of the tasks run by threads 601 and 602 must be maintained to ensure proper operation of the process during replay phase 606.

In the example of FIG. 6, during replay phase 606, thread 601 completes at its checkpoint 603, however, thread 602 completes its task early at time $t_2$ ($t_2 < t_1$) prior to checkpoint 604 and checkpoint 603. In this case, thread 602 may be forced to wait until checkpoint 604 before proceeding to the next task (or ending) to enforce the relative order of completing of tasks by threads 601 and 602. The example of FIG. 6 may be generalized to any number of tasks using multiple checkpoints.

According to a third example innovative procedure, thread-independent recording may be used during the recording phase of a record and replay regression and unit test automation framework, in accordance with the disclosures herein. Thread-independent recording may be used in cases where particular tasks or sets of instructions can be executed by more than one thread or any thread of a multi-thread process. For example, a thread (from among a group of threads) that reaches the execution point first (e.g., after satisfying preconditions) may be instructed to execute a set of thread-independent instructions.

Thread-independent recording may be useful in cases where any thread in a thread pool is able to execute a routine (e.g., task or set of instructions) based on a condition set by some other thread. In order to implement thread-independent recording, a semantic change may be made in the code by adding recording instructions for the recording phase of testing to identify particular communications between the process the external world (i.e., external to the process being tested) as being thread-independent. For example, the identification of a message as thread-independent may be stored in the metadata associated with the message (e.g., by not setting the thread ID field of the meta information so that any thread asking for responses will be delegated these messages by the GUTS engine during the replay phase).

Figure 7:
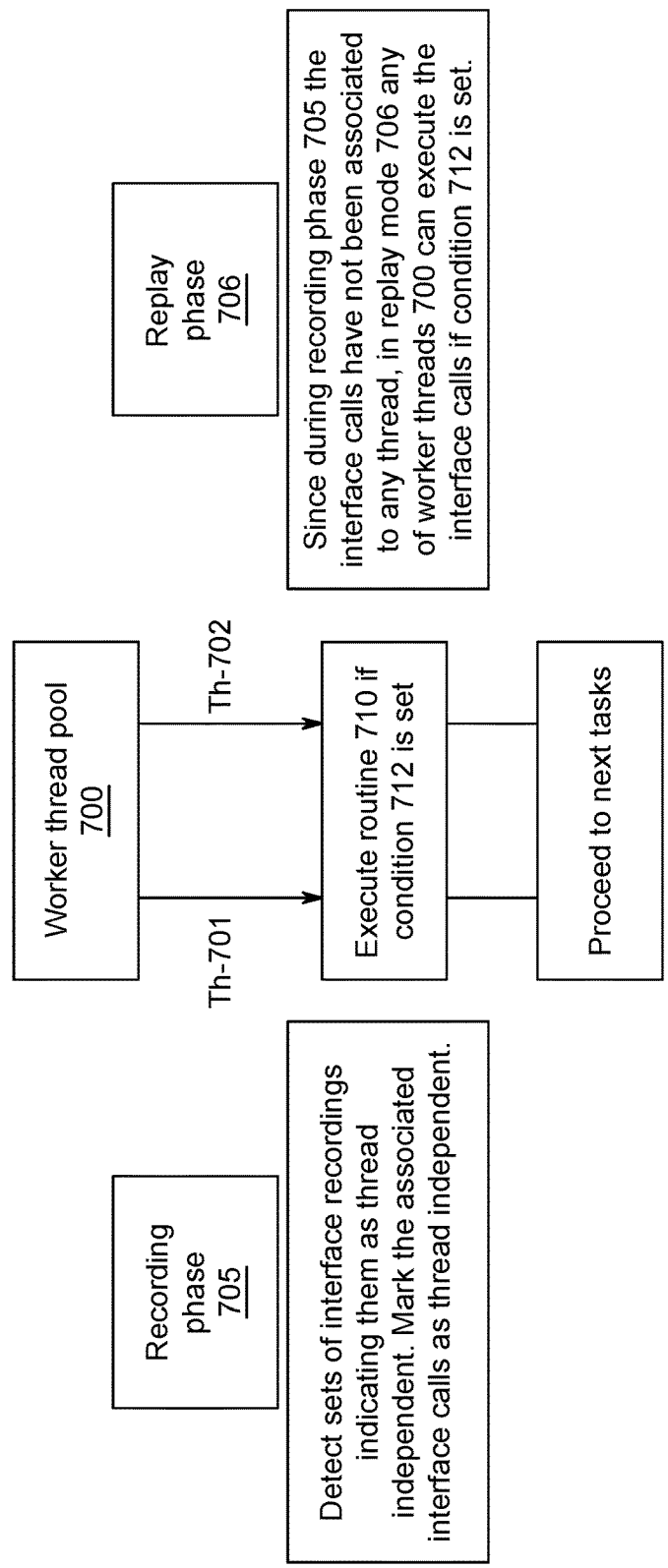
FIG. 7 shows a flow diagram of example a thread pool that can execute a thread-independent routine during a recording phase and a replay phase of a record and replay regression and unit test automation framework, in accordance with the disclosures herein.

FIG. 7 shows a flow diagram of example a thread pool that can execute a thread-independent routine during a recording phase 705 and a replay phase 706 of a record and replay regression and unit test automation framework, in accordance with the disclosures herein. In the example of FIG. 7, any thread from the worker thread pool 700, including threads 701 or thread 702, is able to execute routine 710 of the process being tested once a condition 712 is set (e.g., the execution point is reached).

To achieve thread-independent recording, during the recording phase 705, the GUTS engine may detect sets of interface recordings and may identify or mark particular interface recordings as thread independent, (e.g., by adding code to the GUTS engine to mark the recordings as thread independent and/or by storing an indication in the meta information). In an example, the associated interface calls may be marked as thread-independent during the recording phase 705, by including a thread-independent indicator or flag in the metadata for the corresponding messages.

Since during the recording phase 705 the interface calls have not been associated or linked to any single thread, in replay mode 706 any of worker threads (e.g., threads 701 or 702) from the thread pool 700 may execute the interface calls in routine 710 as soon as a thread sets the condition 712. For example, if thread 701 sets the condition (e.g., reaches the corresponding execution point) before thread 702, then thread 701 may execute routine 710. Thus, the speed of execution of the threads may determine which thread executes routine 710. Once the routine 710 is executed by any one of the threads in the worker thread pool 700, then the threads 701 and 702 may proceed to the next tasks.

According to a fourth example innovative procedure, replay header movement, based on semantic help added as part of code during the recording phase, may be used during the replay phase of a record and replay regression and unit test automation framework, in accordance with the disclosures herein.

The purpose of replay header movement is to force thread synchronization by implementing a state machine during replay mode and may be used to perform repetitive tasks or events during replay mode. In order to implement replay header movement, semantic help by way of specific code may be added to the GUTS engine (i.e., the automation framework) during the recording phase to add a corresponding instruction (e.g., by setting flags during the recording process).

Figure 8:
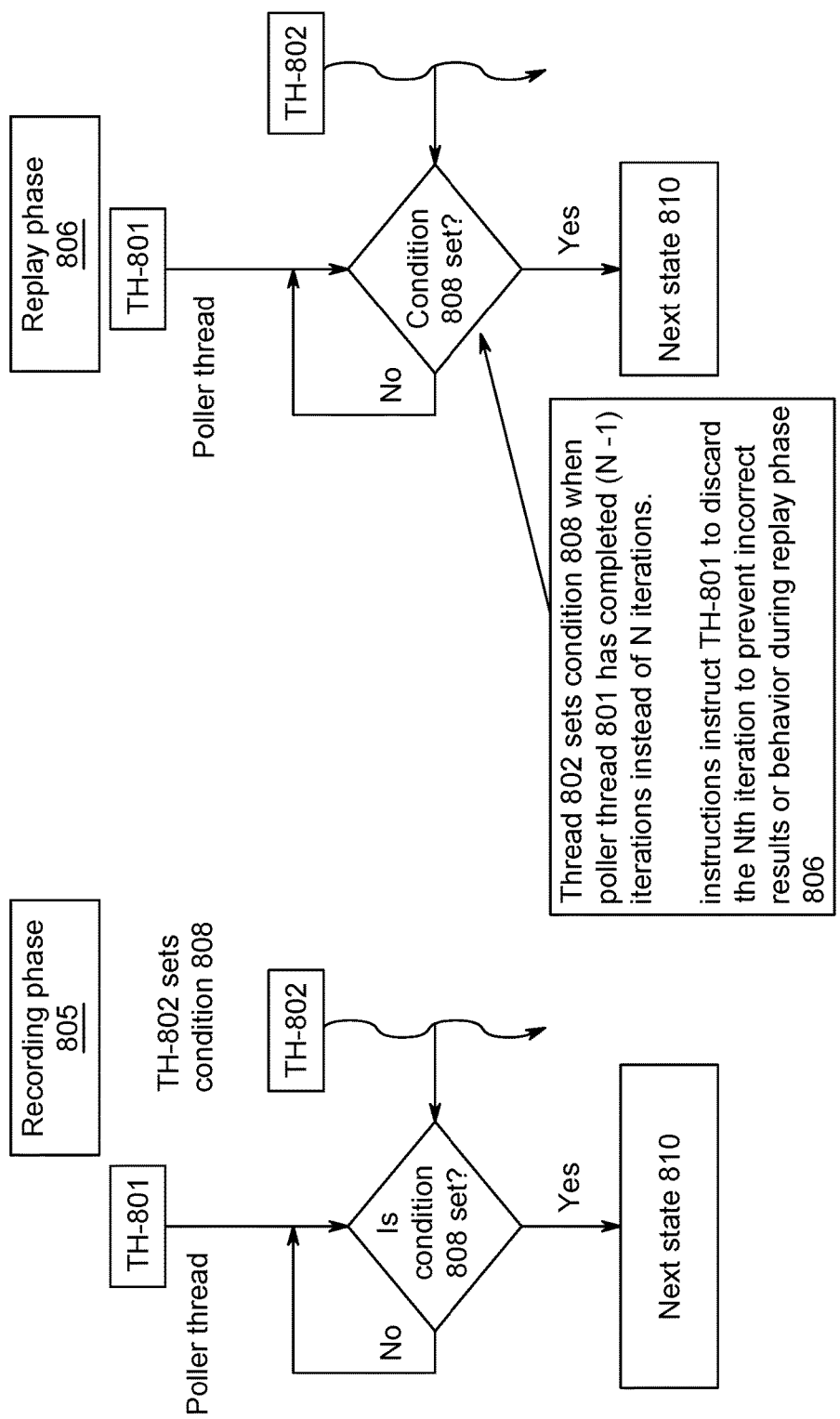
FIG. 8 shows a flow diagram of example use case of state machines for thread execution with replay header movement based on semantic help during a recording phase and a replay phase of a record and replay regression and unit test automation framework, in accordance with the disclosures herein.

FIG. 8 shows a flow diagram of example use case of state machines for thread execution with replay header movement based on semantic help during a recording phase 805 and a replay phase 806 of a record and replay regression and unit test automation framework, in accordance with the disclosures herein. In the example of FIG. 8, during the recording phase 805, a poller thread 801 may continuously poll a routine to determine if condition 808 is set. During the polling process in the recording phase 805, poller thread 801 may execute N iterations of instructions waiting for a condition 808 to be satisfied before moving to a next state 810. In an example, a different thread 802 may set the condition 808.

During replay phase 806, poller thread 801 executes instructions, and it may happen that thread 802 sets the condition 808 earlier than in the recording phase. For example, thread 802 may set condition 808 after poller thread 801 has completed (N−1) iteration of the loop (e.g., more generally X iterations for $1 \leq X < N$), instead of N iterations as in the recording phase 805, because of different thread pacing between the recording phase 805 and the replay phase 806. In this case, the replay phase 806 of the process may take a different path than during the recording phase 805 and result in undesired behavior because an $N^{th}$ iteration executed by thread 801 may cause different and possibly erroneous behavior of the process.

In order to remedy this, the GUTS engine may be configured to move the head pointer in the state machine during the replay phase 806 to the next state 810 immediately following the $(N-1)^{th}$ iteration, and prevent thread 801 from executing the $N^{th}$ iteration, as indicated by the semantic help and/or meta information from the recording phase 805.

According to a fifth example innovative procedure, the execution of test cases may be performed once a system steady state is reached during the replay phase of a record and replay regression and unit test automation framework, in accordance with the disclosures herein. A system (i.e., process) may arrive to a steady state of operation following the execution of a system boot-up sequence. Some or most of the activity (e.g., instruction execution) in steady state operation may include only simple non-intensive tasks, such as keep alive messages and periodic timer executions, whereas the activity during the boot-up sequence may be much more intensive (e.g., reading records from the database, initializing devices and/or process data structures, and/or getting states and/or information from other processes). Thus, according to an embodiment, the execution of test cases arranged, where possible, to run during steady state of the system/process and after the completion of the system boot-up sequence to reduce the amount of recorded data, as illustrated in FIG. 9.

Figure 9:
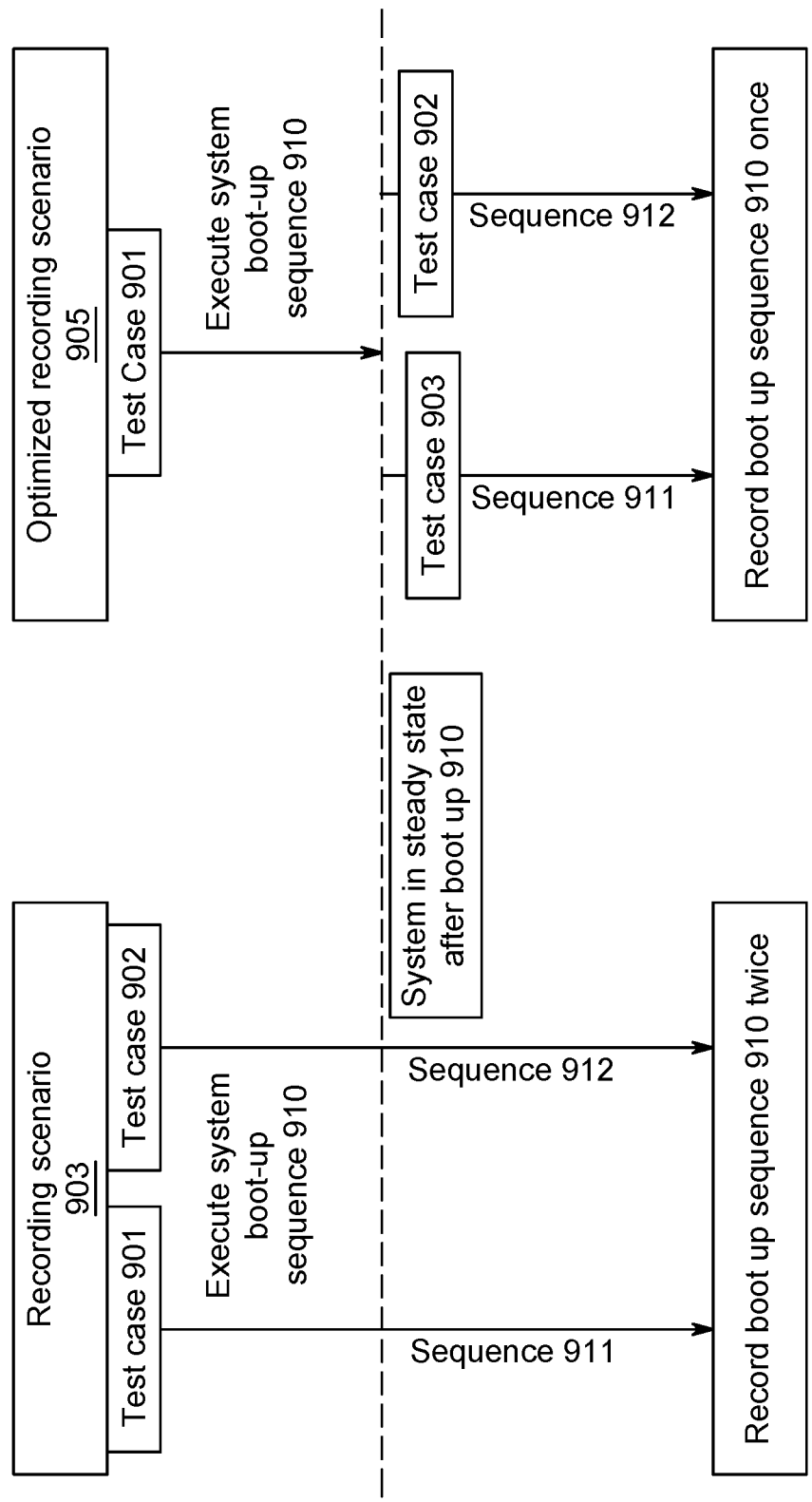
FIG. 9 shows flow diagrams of example recording mode scenarios of a system including the execution of test cases before and after the execution of a boot-up sequence during a recording phase of a record and replay regression and unit test automation framework, in accordance with the disclosures herein.

FIG. 9 shows flow diagrams of example recording mode scenarios of a system (process) including the execution of test cases before and after the execution of a boot-up sequence during a recording phase of a record and replay regression and unit test automation framework, in accordance with the disclosures herein.

According to recording scenario 903, test cases 901 and 902 (e.g., scripts) may start running before the system boot-up sequence 910 is executed. As a result, the recording of sequences 911 and 912 each include records of the system boot-up sequence 910. However, to reduce the amount of data recorded during the recording phase, the test cases 901 and 902 may be split or rearranged into three test cases 901, 902, and 903, as shown in optimized recording scenario 905. According to optimized recording scenario 905, test case 901 is executed during the system boot-up sequence 910, and test cases 903 and 902 are postponed until the system is in steady state. Thus, the system boot-up sequence 910 is only recorded one time, reducing the overall amount of recorded data during the recording phase. This savings can be significant when the amount of communication (message passing) during the boot-up sequence 910 is high.

Figure 10:
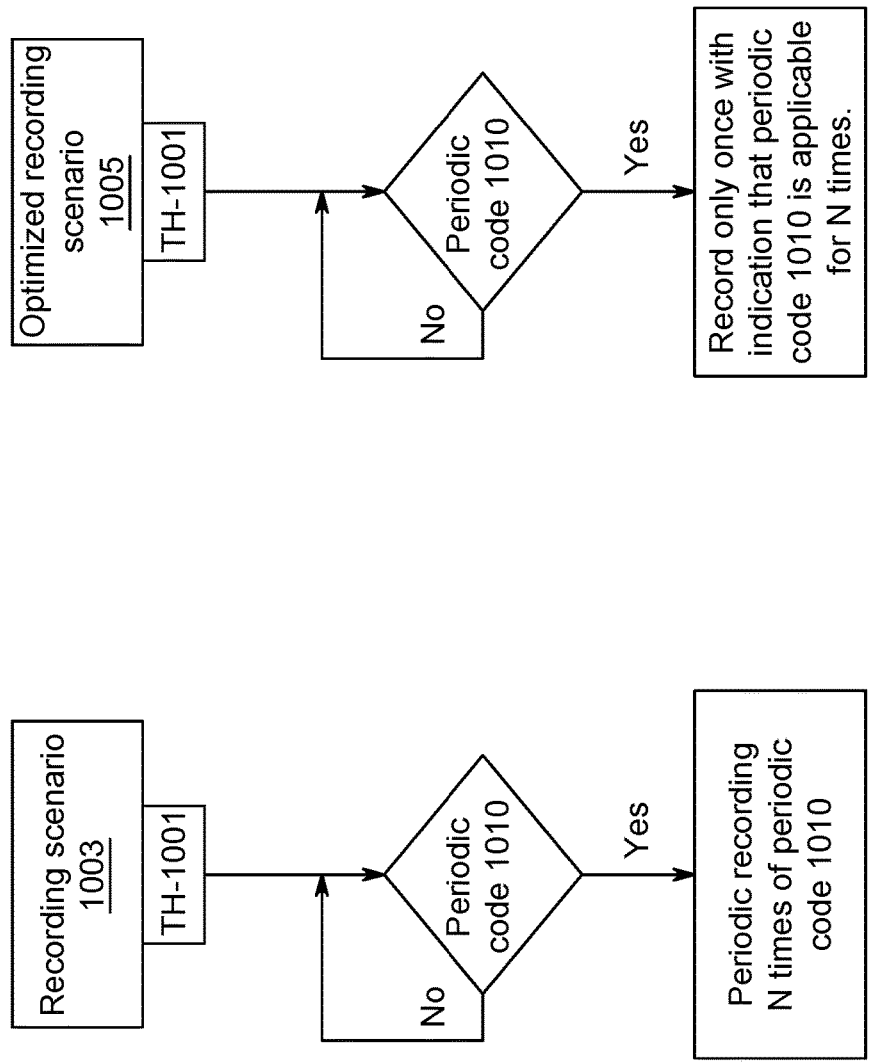
FIG. 10 shows flow diagrams of example recording mode scenarios for recording a periodic (iterative) sequence during a recording phase of a record and replay regression and unit test automation framework, in accordance with the disclosures herein.

In another embodiment, after the boot up sequence is complete, the GUTS engine during replay mode may be instructed to repeatedly replay a single iteration of a periodic sequence for a number of iterations (or until interrupted), thus requiring only one iteration to be recorded during the recording phase. FIG. 10 shows flow diagrams of example recording mode scenarios for recording a periodic (iterative) sequence during a recording phase of a record and replay regression and unit test automation framework, in accordance with the disclosures herein. According to recording phase 1003, thread 1001 may execute periodic code 910 for N iterations and the GUTS engine may record each of the N iterations of the periodic sequence (path). According to optimized recording scenario 1005, thread 1001 similarly may execute periodic code 910 for N iterations but the GUTS engine may only record one iteration of the periodic code and also record information (e.g., in the meta information) indicating that the recorded periodic code should be repeated N times, thus reducing the overall amount of recorded data.

Figure 11A:
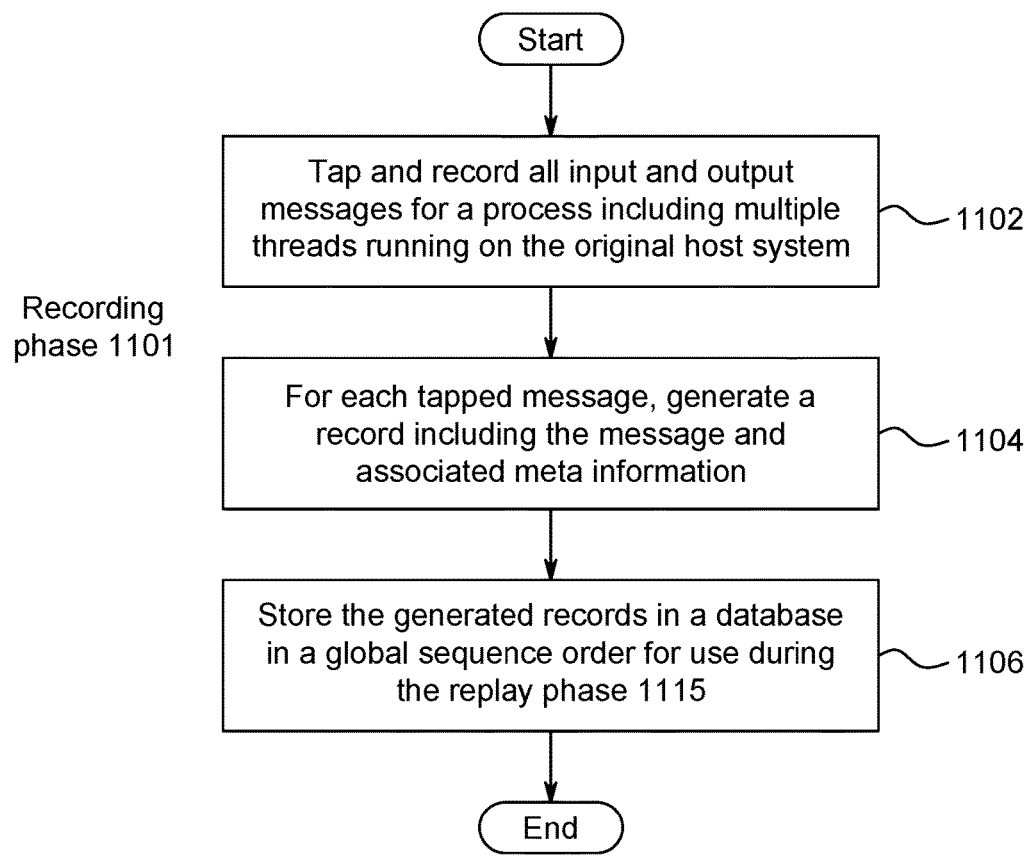
FIGS. 11A and 11B show flow diagrams of example procedures for a recording phase and a replay phase, respectively, of a record and replay regression and unit test automation framework in accordance with the disclosures herein.
Figure 11B:
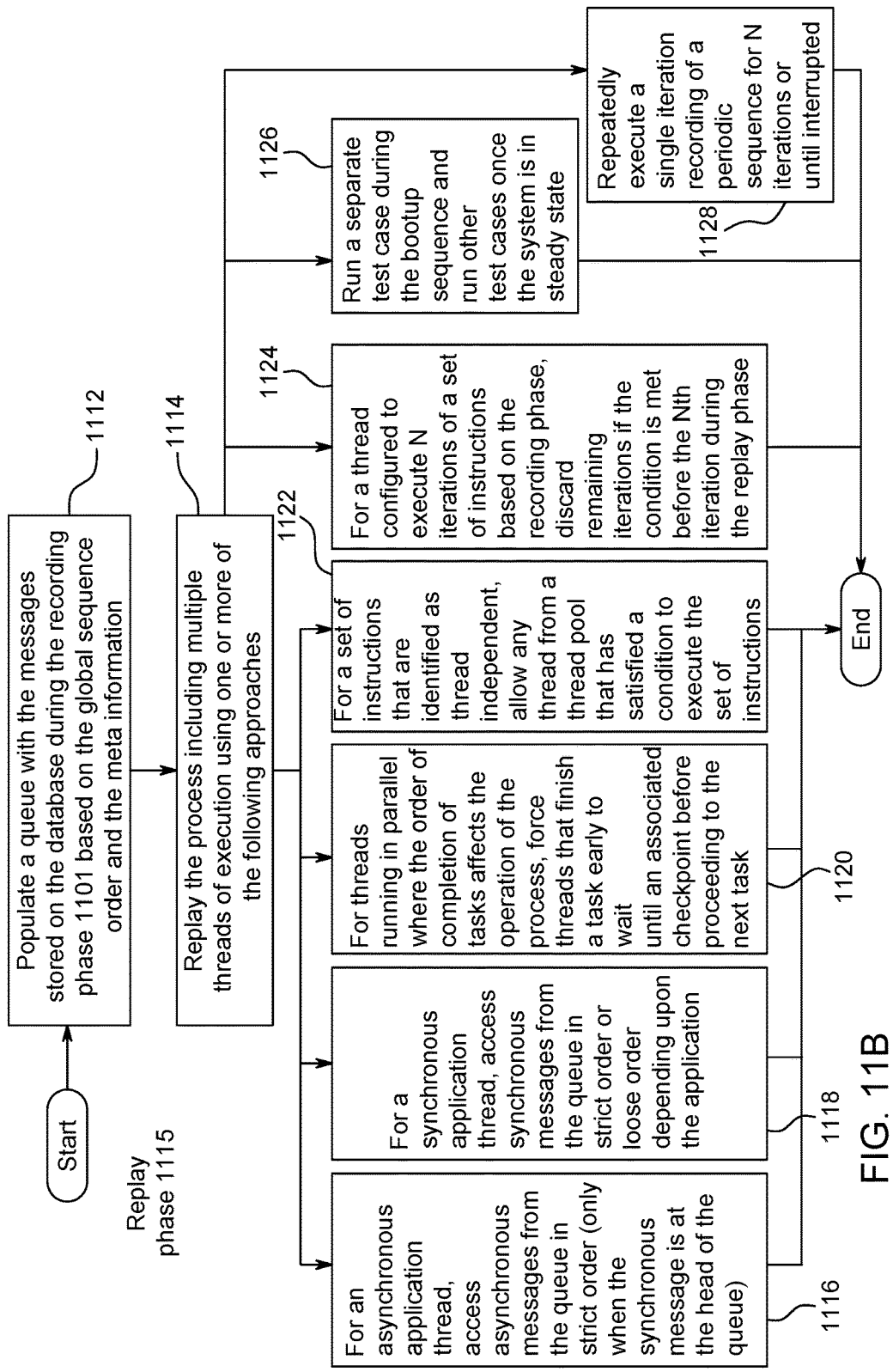

FIGS. 11A and 11B show flow diagrams of example procedures for a recording phase 1101, and a replay phase 1115, respectively, of a record and replay regression and unit test automation framework in accordance with the disclosures herein. The procedures in FIGS. 11A and 11B may be performed by some combination of software and/or hardware configured for testing a process, such as a processing device (e.g., a GUTS engine).

As shown in FIG. 11A, during a recording phase 1101, the GUTS engine may tap and record all input and output messages for a process including multiple threads running on the original host system, 1102. As explained above, the process may be part of an embedded system that is part of a larger, complex and costly machine or piece of specialized equipment for example. At 1104, for each tapped message, the GUTS engine may generate a record including the message and associated meta information that may be used during the replay phase 1115. Examples of meta information are described throughout the disclosures herein. At 1106, the GUTS engine may store the generated records in a database (and/or file) in a global sequence order (timing order) for use during the replay phase 1115.

As shown in FIG. 11B, during a replay phase 1115, the GUTS engine may populate a queue with the messages stored on the database during the recording phase 1101 based on the global sequence order (timing order) and meta information, 1112. At 1114, the GUTS engine may replay the process being tested, including multiple threads of execution, employing one or more of the approaches in 1116, 1118, 1120, 1122, 1124, 1126, 1128.

At 1116, for an asynchronous application thread, the GUTS engine may access asynchronous message from the queue in strict order when the synchronous message is at the head of the queue. At 1118, for a synchronous application thread, the GUTS engine may access synchronous messages from the queue in strict order or loose order dependent upon the application, as may be determined from the meta information.

At 1120, for threads running in parallel where the order of completion of tasks affects the operation of the process, the GUTS engine may force the parallel threads that finish the task early to wait until an associated checkpoint, as may be determined from the meta information, before proceeding to the next task. At 1122, for a set of instructions that are identified as thread independent by the meta information, the GUTS engine may allow any thread in a thread pool that has satisfied a condition to execute the set of instructions. At 1124, for a thread configured to execute N iterations of a set of instructions, the GUTS engine may discard remaining iterations if the condition is met before the $N^{th}$ iteration as identified by the meta information. At 1126, the GUTS engine may run a separate test case during the boot-up sequence and run other test cases once the system is in steady state. At 1128, the GUTS engine may also repeatedly execute a single iteration recording of a periodic sequence for N iterations (or until interrupted) as identified by the meta information. In an example, the GUTS engine may be a combination of software and/or hardware and may be implement as a device and/or processor, as shown in FIG. 12).

Figure 12:
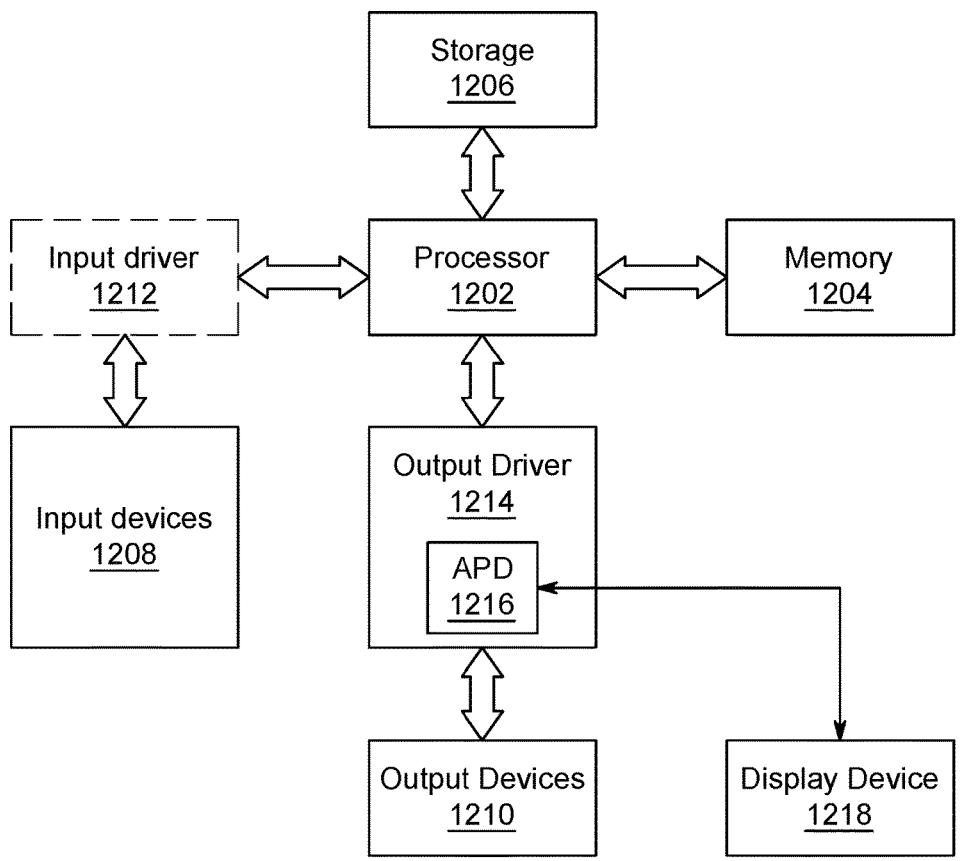
FIG. 12 is a block diagram of an example device in which one or more disclosed embodiments may be implemented.

FIG. 12 is a block diagram of an example device 1200 in which one or more disclosed embodiments may be implemented. The device 1200 may include, for example, a computer, a gaming device, a handheld device, a set-top box, a television, a mobile phone, or a tablet computer. The device 1200 may include a processor 1202, a memory 1204, a storage 1206, one or more input devices 1208, and/or one or more output devices 1210. The device 1200 may include an input driver 1212 and/or an output driver 1214. The device 1200 may include additional components not shown in FIG. 12.

The processor 1202 may include a central processing unit (CPU), a graphics processing unit (GPU), a CPU and GPU located on the same die, or one or more processor cores, wherein each processor core may be a CPU or a GPU. The memory 1204 may be located on the same die as the processor 1202, or may be located separately from the processor 1202. The memory 1204 may include a volatile or non-volatile memory, for example, random access memory (RAM), dynamic RAM, or a cache.

The storage 1206 may include a fixed or removable storage, for example, a hard disk drive, a solid state drive, an optical disk, or a flash drive. The input devices 1208 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 1210 may include a display, a speaker, a printer, a haptic feedback device, one or more lights, an antenna, or a network connection (e.g., a wireless local area network card for transmission and/or reception of wireless IEEE 802 signals).

The input driver 1212 may communicate with the processor 1202 and the input devices 1208, and may permit the processor 1202 to receive input from the input devices 1208. The output driver 1214 may communicate with the processor 1202 and the output devices 1210, and may permit the processor 1202 to send output to the output devices 1210. The output driver 1216 may include an accelerated processing device ("APD") 1216 which may be coupled to a display device 1218. The APD may be configured to accept compute commands and graphics rendering commands from processor 1202, to process those compute and graphics rendering commands, and to provide pixel output to display device 1218 for display.

It should be understood that many variations are possible based on the disclosure herein. Although features and elements are described above in particular combinations, each feature or element may be used alone without the other features and elements or in various combinations with or without other features and elements.

The methods and elements (e.g., the GUTS engine) disclosed herein may be implemented in/as a general purpose computer, a processor, a processing device, or a processor core. Suitable processing devices include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods, flow charts and elements disclosed herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A system configured to perform automated record and replay regression and unit testing of a process, the system comprising:
a processing device, during a recording phase, configured to:
tap and record all input messages to a first instance of the process and all output messages from the first instance of the process for at least one test case to generate a plurality of messages that capture a complete external environment of the process during the recording phase;
for each message of the plurality of messages, generate a record including the message and associated meta information, wherein the associated meta information is used to replay the plurality of messages in a replay phase to test the process, and wherein the meta information includes at least a sequence number used to define a timing order of the plurality of messages during the recording phase;
store the generated records in a database; and
the processing device, during a replay phase, configured to:
retrieve the records stored in the database;
populate a queue with the plurality of messages in the stored records based on the associated meta information; and
replay a second instance of the process by executing a plurality of threads associated with the second instance of the process in parallel and accessing the plurality of messages from the queue in accordance with the meta information to synchronize the plurality of threads and recreate the complete external environment of the process in order to detect errors in the second instance of the process during the replay phase.

2. The system of claim 1, wherein:
the processing device, during the replay phase, is further configured to determine a message type of a message in the plurality of messages from the associated meta information, wherein message types include: asynchronous type and synchronous type; and
the processing device, during the replay phase, is configured to replay the second instance of the process by accessing asynchronous type messages from the queue in strict order, and accessing synchronous type messages from the queue in strict order or loose order depending upon the process.

3. The system of claim 1, wherein:
the processing device, during the replay phase, is further configured to determine, from the meta information, a checkpoint associated with a task, wherein the checkpoint defines an ending time for the task; and
the processing device, during the replay phase, is configured to replay the second instance of the process by forcing at least one parallel thread that has completed executing the task to wait until the checkpoint before proceeding to a next task.

4. The system of claim 1, wherein:
the processing device, during the replay phase, is further configured to determine, from the meta information, that a set of instructions is identified as thread independent indicating that the set of instructions can be executed by any thread in a pool of threads; and
the processing device, during the replay phase, is configured to allow a first thread in the pool of threads that has reached an execution point before other threads in the pool of threads to execute the set of instructions.

5. The system of claim 1, wherein:
the processing device, during the replay phase, is further configured to determine, from the meta information, a number N of iterations associated with an iterative set of instructions setting a condition during the recording phase; and
the processing device, during the replay phase, is configured to allow a thread to execute the iterative set of instructions setting the condition in X iterations and discard a remaining N–X iterations for $1 \leq X < N$.

6. The system of claim 1, wherein:
the processing device, during the replay phase, is further configured to run a first test case during a boot-up sequence of the process, and run other tests cases once the process has reached a steady state as determined by the meta information.

7. The system of claim 1, wherein:
the processing device, during the replay phase, is further configured to repeatedly execute a single recording of a periodic sequence for N iterations as determined by the meta information.

8. The system of claim 1, wherein the plurality of messages are passed as communications between the process and external processes during the recording phase.

9. The system of claim 1, wherein the process interacts with an original hardware system during the recording phase and the process interacts with a different hardware system during the replay phase.

10. The system of claim 1, wherein errors are detected by comparing and determining differences between output messages from the first instance of the process during the recording phase and output messages from the second instance of the process during the replay phase.

11. A method for performing automated record and replay regression and unit testing of a process, the method comprising:
during a recording phase:
tapping and recording all input messages to a first instance of the process and all output messages from the first instance of the process for at least one test case to generate a plurality of messages that capture a complete external environment of the process during the recording phase;
for each message of the plurality of messages, generating a record including the message and associated meta information, wherein the associated meta information is used to replay the plurality of messages in a replay phase to test the process, and wherein the meta information includes at least a sequence number used to define a timing order of the plurality of messages during the recording phase;
storing the generated records in a database; and
during a replay phase:
retrieving the records stored in the database;
populating a queue with the plurality of messages in the stored records based on the associated meta information; and replaying a second instance of the process by executing a plurality of threads associated with the second instance of the process in parallel and accessing the plurality of messages from the queue in accordance with the meta information to synchronize the plurality of threads and recreate the complete external environment of the process in order to detect errors in the second instance of the process during the replay phase.

12. The method of claim 11, further comprising:

during the replay phase, determining a message type of a message in the plurality of messages from the associated meta information, wherein message types include: asynchronous type and synchronous type; and during the replay phase, replaying the second instance of the process by accessing asynchronous type messages from the queue in strict order, and accessing synchronous type messages from the queue in strict order or loose order depending upon the process.

13. The method of claim 11, further comprising:

during the replay phase, determining, from the meta information, a checkpoint associated with a task, wherein the checkpoint defines an ending time for the task; and during the replay phase, replaying the second instance of the process by forcing at least one parallel thread that has completed executing the task to wait until the checkpoint before proceeding to a next task.

14. The method of claim 11, further comprising:

during the replay phase, determining, from the meta information, that a set of instructions is identified as thread independent indicating that the set of instructions can be executed by any thread in a pool of threads; and during the replay phase, allowing a first thread in the pool of threads that has reached an execution point before other threads in the pool of threads to execute the set of instructions.

15. The method of claim 11, further comprising:

during the replay phase, determining, from the meta information, a number N of iterations associated with an iterative set of instructions setting a condition during the recording phase; and during the replay phase, allowing a thread to execute the iterative set of instructions setting the condition in X iterations and discard a remaining N−X iterations for $1 \leq X < N$.

16. The method of claim 11, further comprising:

during the replay phase, running a first test case during a boot-up sequence of the process, and running other tests cases once the process has reached a steady state as determined by the meta information.

17. The method of claim 11, further comprising:

during the replay phase, repeatedly executing a single recording of a periodic sequence for N iterations as determined by the meta information.

18. The method of claim 11, wherein the plurality of messages are passed as communications between the process and external processes during the recording phase.

19. The method of claim 11, wherein the process interacts with an original hardware system during the recording phase and the process interacts with a different hardware system during the replay phase.

20. The method of claim 11, wherein errors are detected by comparing and determining differences between output messages from the first instance of the process during the recording phase and output messages from the second instance of the process during the replay phase.

* * * * *